United States Patent [19]

Bonafous

[11] Patent Number: 4,608,913
[45] Date of Patent: Sep. 2, 1986

[54] ACTUATOR WITH PNEUMATIC ENERGY ACCUMULATOR MORE ESPECIALLY FOR COCK VALVES

[75] Inventor: Maurice Bonafous, Oloron, France

[73] Assignee: Applications Mecaniques et Robinetterie Industrielle A.M.R.I., Bagnolet, France

[21] Appl. No.: 614,458

[22] Filed: May 25, 1984

[30] Foreign Application Priority Data

Jun. 6, 1983 [FR] France .................. 83 09345

[51] Int. Cl.⁴ .......................................... F16K 31/124
[52] U.S. Cl. ......................................... 92/134; 60/413; 91/5; 251/58; 137/599.2
[58] Field of Search ............... 60/414, 413; 91/5, 401, 91/422, 443; 92/138, 134; 251/58; 137/599.2; 138/42

[56] References Cited

U.S. PATENT DOCUMENTS

| | | | |
|---|---|---|---|
| 3,118,349 | 1/1964 | Combs | 91/401 |
| 3,248,879 | 5/1966 | Natho | 92/134 |
| 3,452,961 | 7/1969 | Fursman | 92/138 |
| 3,998,132 | 12/1976 | Rasigade | 91/401 |
| 4,036,108 | 7/1977 | Phillips | 92/134 |
| 4,041,840 | 8/1977 | Zirps | 91/422 |
| 4,216,703 | 8/1980 | Schoeneweis | 92/134 |
| 4,226,167 | 10/1980 | Lew | 92/134 |
| 4,337,691 | 7/1982 | Tomaru | 92/138 |
| 4,349,175 | 9/1982 | Alckerman et al. | 91/5 |
| 4,466,493 | 8/1984 | Wohlwend | 92/134 |

Primary Examiner—Robert E. Garrett
Assistant Examiner—Richard S. Meyer
Attorney, Agent, or Firm—Scully, Scott, Murphy & Presser

[57] ABSTRACT

The present invention provides an actuator comprising a hydraulic cylinder whose rod is connected to the shaft driving the controlled device by means of a transmission. The end of the rod of the cylinder penetrates into an accumulation chamber connected to the intake circuit of said cylinder through a distribution circuit comprising at least one non return calibrated valve and a balancing distributor with push rod and spring return which allows the drive fluid of the cylinder to be admitted into said accumulation chamber when the rod of said cylinder is at the end of travel under the effect of the drive fluid.

10 Claims, 8 Drawing Figures

ACTUATOR WITH PNEUMATIC ENERGY ACCUMULATOR MORE ESPECIALLY FOR COCK VALVES

BACKGROUND OF THE INVENTION

1. Field of the Invention

The present invention relates to a single acting hydraulic or pneumatic actuator ensuring, by means of a pneumatic energy accumulator, the return thereof to its initial position and holding same in this position when the pressure of the hydraulic drive fluid drops below a predetermined pressure. This initial position is generally a safety position for the controlled device.

It applies more particularly, but not exclusively, to the rotational drive of the operating shaft of a device such as a valve or a cock.

2. Description of the Prior Art

For this type of application numerous embodiments have already been proposed.

Thus, for example, from French Pat. No. 1 460 561, an actuator is known using a hydraulic or pneumatic cylinder whose rod is connected to the drive shaft of the cock through a transmission system irreversibly converting the rectilinear movement of the rod of the cylinder into a quarter of a turn rotational movement of the shaft driving the valving member of the cock. In this embodiment, the cylinder is double acting and controls in one direction the opening and, in the other direction, the closing of the cock. However, a disadvantage of this type of actuator consists in requiring, both for opening and closing, the admission into the cylinder of a pressurized drive fluid, so that in the absence of pressurized drive fluid, for example following a breakdown of the pressurized fluid generator or a break in the ducts supplying the cylinder, the actuator remains in the position which it occupied at the time of the breakdown. Thus, if the cock is open, it will remain open without the immediate possibility of being closed again (or conversely).

To overcome these drawbacks, actuators have also been proposed of the kind using a single acting cylinder for operating the valving member of the cock and an energy accumulation device for returning the valving member of the cock to the safety position and holding it there when the pressure of the drive fluid drops below a certain value. The energy accumulation devices used in these actuators often comprise springs, for example simple helical springs, which are compressed by the rod of the cylinder when this latter is subjected to the pressure of the drive fluid and absorb, in the form of potential energy, a part of the energy of the cylinder and which restore this energy by pushing the rod of the cylinder back to its initial position when this latter is no longer driving. French Pat. No. 2 304 957 in particular describes an energy accumulation system for obtaining, during the return of the actuator to its initial position and in the absence of control pressure, a return force whose value varies as a function of the movement of the rod of the cylinder according to a law appropriate for the desired aims.

However, these energy accumulation actuators, having a mechanical structure, present a number of drawbacks:

They are generally heavy and relatively cumbersome and sometimes complex from the mechanical point of view, which adversely affects their reliability.

They require the use of relatively powerful actuating cylinders with respect to the force required for providing only operation of the cock (opening or closing). In fact, during operation of the cock, the cylinder must produce a double force (the force required for effectively opening the cock plus the force applied to the accumulation device for storing the energy required for returning the cock to the safety position).

They are subject to wear, corrosion and/or spring fatigue phenomena so that in the long run the safety function may become defective.

The aim of the invention is then to overcome all these disadvantages. For this it provides an actuator in which the energy accumulator is of the pneumatic type and in which the charge of the accumulator with potential energy is provided by the pressurized drive fluid which supplies the cylinder.

SUMMARY OF THE INVENTION

To arrive at these results, the actuator of the invention is formed conventionally of an actuating cylinder, preferably single acting, whose rod is connected to the drive shaft of the controlled device through a transmission system converting the rectilinear movement of the rod of the cylinder into a rotational movement of said drive shaft. This actuator is more particularly characterized in that the end of the rod of the cylinder or of an extension of this rod penetrates sealingly inside an accumulation chamber connected to the admission circuit of the drive fluid for the cylinder through a distribution circuit comprising at least one calibrated non return valve and a balancing distributor, for example with push rod and spring loaded return which allows the intake of the drive fluid for the cylinder into the accumulation chamber when the rod of the piston is in an extended end of travel position under the effect of the pressure of the drive fluid in the cylinder.

The operation of this actuator may then occur as follows.

In the absence of drive fluid pressure, the cylinder, at rest, is in the retracted condition. The intake of the drive fluid into the cylinder then causes extension of the rod and rotation of the operating shaft. At the end of travel of the rod, the distributor opens and pressurizes the accumulation chamber. When the pressure difference between the drive fluid in the chamber of the cylinder and in the accumulation chamber drops below a predetermined threshold, the calibrated non return valve closes again. The actuator is then in the set position.

If, following a voluntary or accidental action, the pressure of the drive fluid inside the cylinder is relieved or drops below a predetermined value, under the effect of the pressure of the fluid contained in the accumulation chamber, on the end of the rod of the piston (or its extension), the cylinder will return to the retracted position, thus bringing the drive shaft of the controlled device back to its initial position.

It will be noted that the distribution circuit of the actuator of the invention may further advantageously comprise a decompression circuit connecting the accumulation chamber to the drive fluid intake circuit, this circuit comprising a secondary distributor driven by the pressure reigning in the supply chamber and a constriction (calibrated leak) for braking the passage of the fluid.

Thus, when the pressure of the fluid inside the accumulation chamber rises above a predetermined threshold, for example following heating, the secondary distributor opens and lets a braked fluid stream pass through the constriction until the pressure level inside the supply chamber becomes again admissible.

According to another feature of the invention, said distribution circuit is mounted inside the rod of the cylinder or its extension of the actuator. In this case, the balancing distributor comprises a push rod extending axially beyond the end of the rod of the cylinder so that at the end of the outward travel of the cylinder, it comes into abutment against a fixed piece integral with the wall of the accumulation chamber or against the wall itself.

For this, the rod of the piston and the piston itself have a coaxial through-bore, preferably cylindrical, for communicating the work chamber of the cylinder with the accumulation chamber. Inside this chamber there is mounted a distribution system comprising a cylindrical tubular body having, on the same side as the end of the rod of the piston and at a given distance therefrom, at least one lateral aperture giving onto an axial groove formed in the outer wall of said body. This axial groove forms, with the cylindrical internal surface of the rod, an axial channel opening into the accumulation chamber.

Inside the tubular body is slidably mounted a cylindrical slide, retained axially in one direction by a collar coming into abutment against the tubular body. This slide extends, on the accumulation chamber side, beyond the end of the rod of the piston so as to form a push rod and is urged on the other side (cylinder side) by a compression spring which tends to push the slide back towards the accumulation chamber until the collar comes into abutment against said body.

Furthermore, this slide comprises at least two successive chambers, namely an intake chamber opening at the end of the slide and a discharge chamber. These two chambers comprise respectively at least two lateral orifices connected together by an axial groove formed in the outer surface of the slide.

The discharge chamber further comprises a discharge orifice closed off by the body when the collar of the slide is in abutment against the body and which is intended to come into communication with the lateral orifice of the body, during an axial movement of the slide against the action of the spring, for example following a mechanical or hydraulic pressure exerted on the part forming push rod.

The intake chamber comprises, between its lateral orifice and its end orifice, a calibrated valve comprising a seat onto which comes to bear a ball urged by a spring in the direction opposite the direction of admission of the fluid.

So as to allow decompression of the accumulation chamber in the case of an over pressure, the slide comprises, between the intake chamber and the discharge chamber, an intermediate chamber connected to the discharge chamber through a calibrated leak which may consist of a sintered element forming a wall between the two chambers.

The intermediate chamber further communicates with the intake chamber through at least two respective lateral orifices connected together by an axial groove.

BRIEF DESCRIPTION OF THE DRAWINGS

One embodiment of the invention will be described hereafter by way of non limitative example with reference to the accompanying drawings in which:

FIGS. 3b, 4b, and 5b show respectively the hydraulic diagrams corresponding to the positions of the distribution systems shown in FIGS. 3a, 4a and 5a.

DESCRIPTION OF THE PREFERRED EMBODIMENTS

Figure 1:
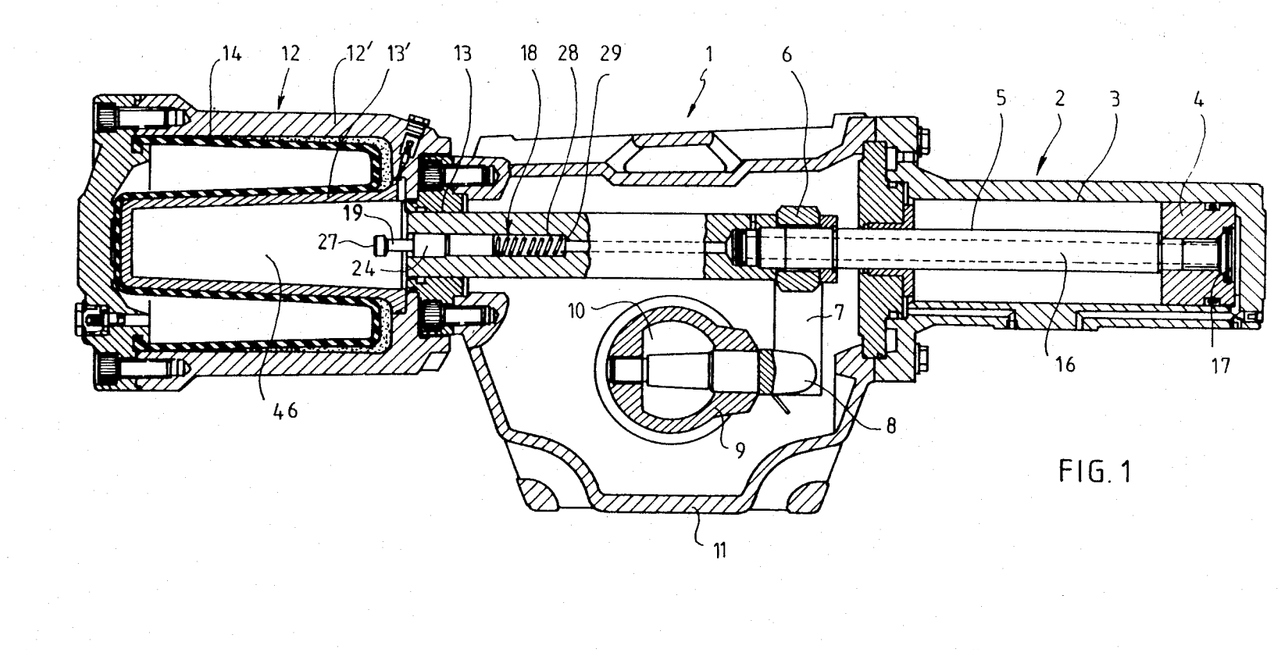
FIGS. 1 and 2 show, in longitudinal section, an actuator for a quarter of a turn valving member, in the rest position (FIG. 1) and in the set position (FIG. 2) of the valving member.
Figure 2:
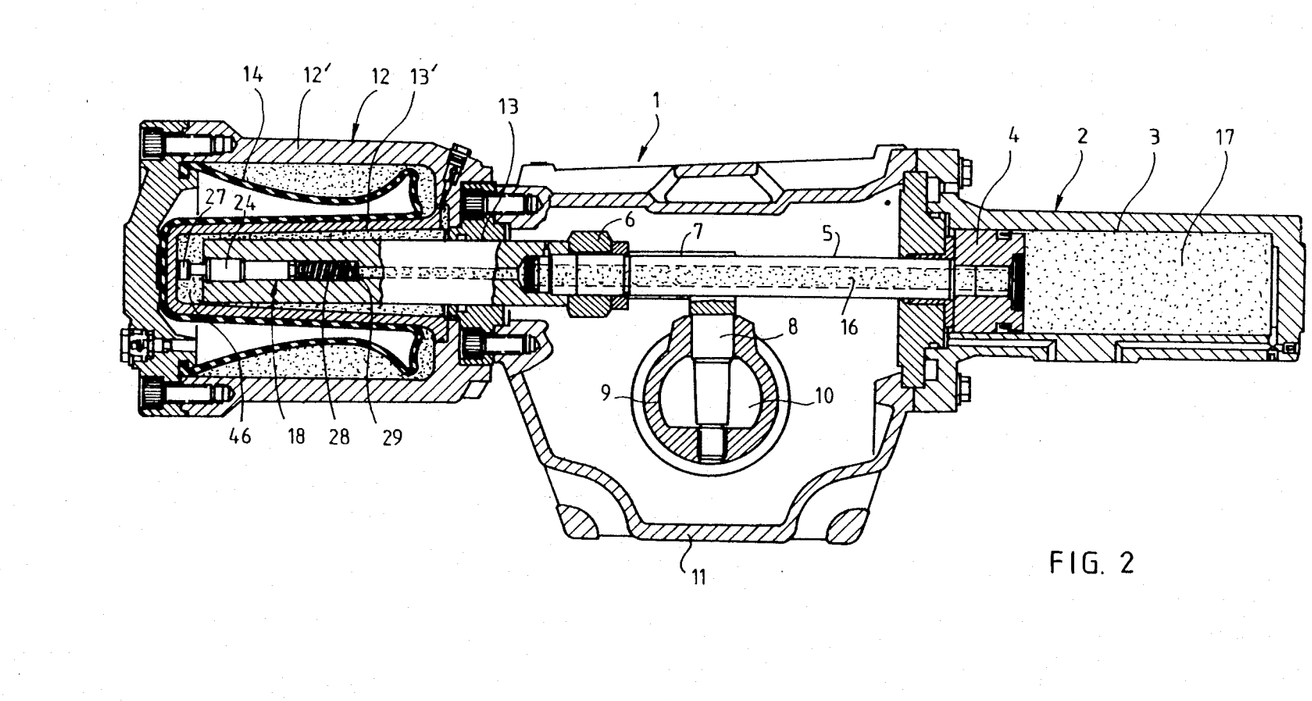

With reference to FIGS. 1 and 2, the actuator 1 comprises a single acting hydraulic cylinder 2 comprising in a way known per se a cylinder 3 and a piston 4 integral with a rod-forming assembly (designated hereafter rod 5) rectilinearly movable. This rod 5 comprises, in its central part, a flange 6 on which is pivotably mounted at least one link 7 itself pivotably mounted to a lever arm 8 integral with a mandrel 9 fixedly mounted on the shaft 10 actuating the valving member of the cock. It should be mentioned that rod 5 of cylinder 2 as well as the elements of the transmission and conversion system, namely link 7 and lever arm 8, are situated in planes orthogonal to the drive shaft 10 of the valving member of the cock.

The above described transmission and conversion system is housed in a case or body 11 of the actuator, on which the hydraulic cylinder 2 is mounted.

On this body 11 there is also mounted, on the side opposite the cylinder 2 and coaxially with cylinder 2, a pneumatic energy accumulator 12 having a coaxial orifice 13 in which the end of rod 5 of cylinder 2 is sealingly and slidingly engaged.

Inside this accumulator 12, the passage of the end of rod 5 of cylinder 2 is protected by a protection bell 13' fixed by its base around orifice 13. The "toric" volume included between the outer enclosure 12' of the accumulator 12 and the protection bell 13' contains a resilient membrane 14 of corresponding shape into which a pressurized gas such as nitrogen may be injected.

As mentioned above, the rod 5 of the cylinder and the piston have a coaxial through bore 16 for communicating the work chamber 17 of cylinder 2 with accumulation chamber 46. In this bore is disposed, on the same side as the end of the rod, a distribution system 18 such as the one shown in Figures 3a, 4a, and 5a.

Figure 3A:
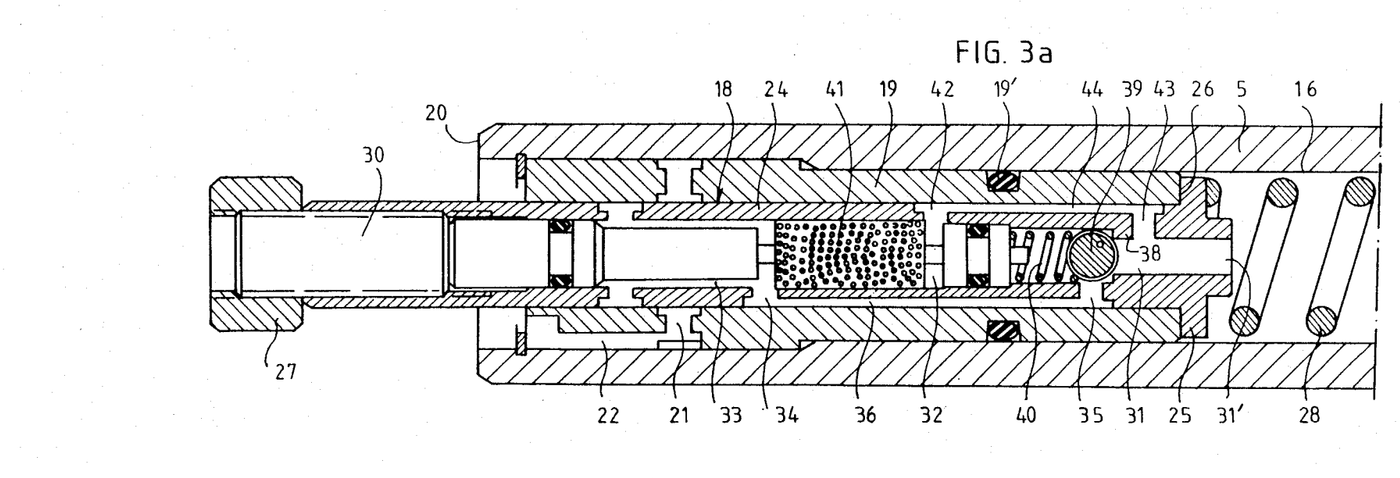
FIGS. 3a, 4a and 5a are axial sections on a larger scale of the rod part of the cylinder or its extension incorporating the distribution system, in the initial position (FIG. 3a), in the end of setting position (FIG. 4a) and providing the over pressure function in the accumulation chamber (FIG. 5a)
Figure 4A:
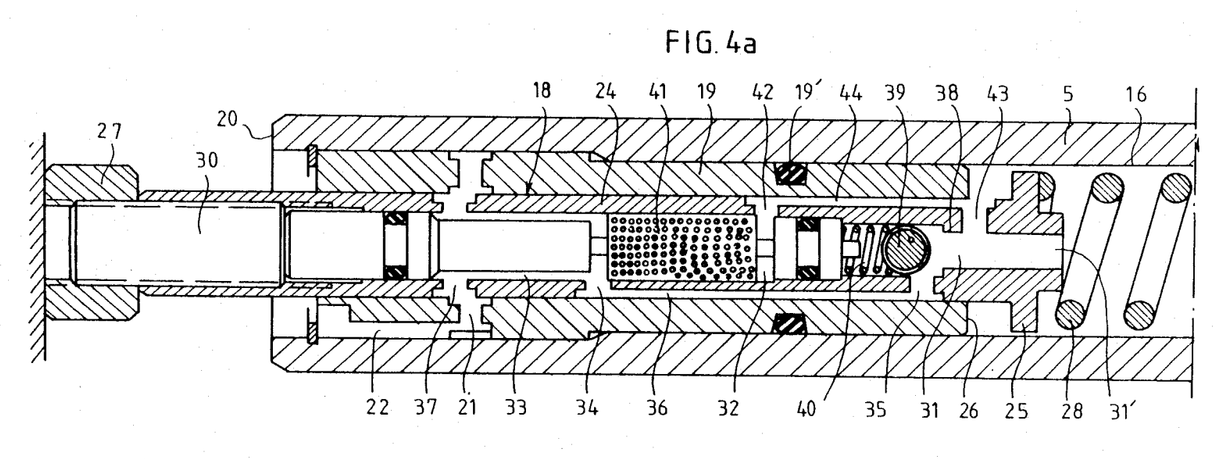
Figure 5A:
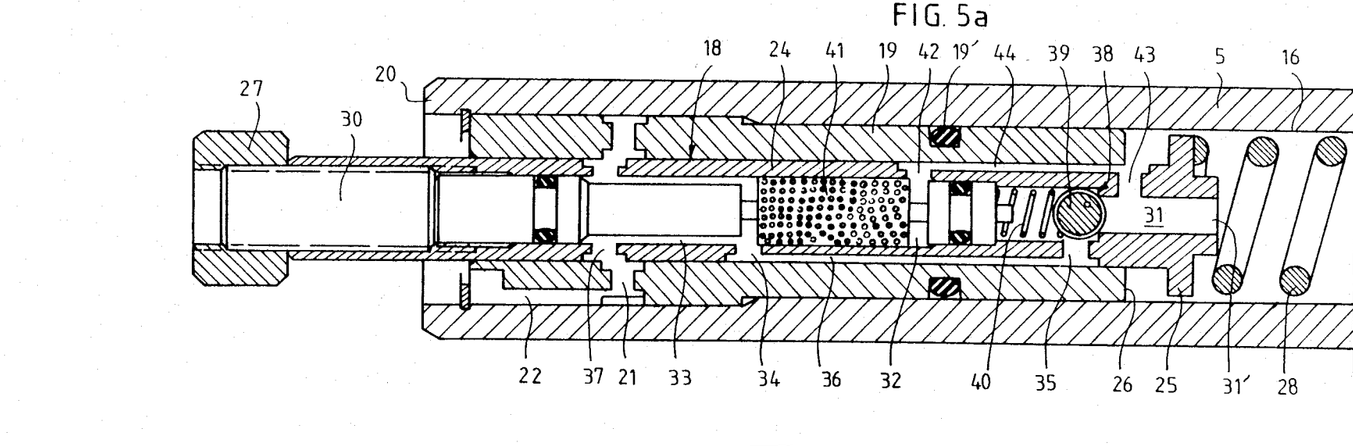

This distribution system comprises a cylindrical tubular body 19 securely and sealingly (seal 19') mounted in bore 16. This tubular body 19 comprises, on the same side as the end 20 of rod 5 of cylinder 2, at least one lateral orifice 21 giving into an axial groove 22 formed in the outer wall of said body 19. This axial groove 22 forms with bore 16 of rod 5 an axial channel opening into the accumulation chamber 46.

Inside the tubular body 19 is slidably mounted a cylindrical slide valve 24 retained axially in one direction by collar 25 coming into abutment against the end (edge 26) of the tubular body 19 situated on the cylinder 2 side.

This slide valve 24 extends, on the accumulation chamber 46 side beyond the end 20 of rod 5 of cylinder 2, so as to form a push rod 27 and is urged, on the other side, at the level of collar 25, by a compression spring 28 retained by a shoulder of bore 29 (FIGS. 1 and 2).

Spring 28 is operative for pushing slide valve 24 back towards the accumulation chamber 46 until collar 25 comes into abutment against said body 19.

More precisely, slide valve 24 has a tubular structure inside which is disposed a rod 30 in one or more pieces, suitably machined for forming the different chambers of the distribution system.

In the example shown, these chambers are three in number namely:

an intake chamber 31 opening at the end of slide valve 24, on the cylinder 2 side,
an intermediate chamber 32, and
a discharge chamber 33.

The intake 31 and discharge 33 chambers comprise respectively at least two lateral orifices 34, 35, connected together by an axial groove 36 formed in the outer surface of slide valve 24.

The discharge chamber further comprises a discharge orifice 37 closed off by body 19 when collar 25 is in abutment against end 26 of said body 19, as shown in FIG. 3a. This discharge orifice 37 comes on the other hand into communication with the lateral orifice 21 of body 19, following an axial movement of slide valve 24, against the action of spring 28 as shown in FIG. 4a.

The intake chamber 31 comprises, between its lateral orifice 35 and its endmost orifice 31', a calibrated valve comprising a seat 38 onto which comes to bear a ball 39 urged by a spring 40 in the direction opposite the direction of admission of the fluid.

Part 41 of rod 30 separating the discharge chamber 33 and the intermediate chamber 32 is formed by means of a sintered element allowing a calibrated leak of the hydraulic fluid.

Moreover, the intermediate chamber 32 is connected to the intake chamber 31 by two respective lateral orifices 42, 43, connected together by an axial channel 44, the orifice 43 of the intake chamber 31 being situated upstream of the calibrated valve (ball 39-seat 38).

Figure 3B:
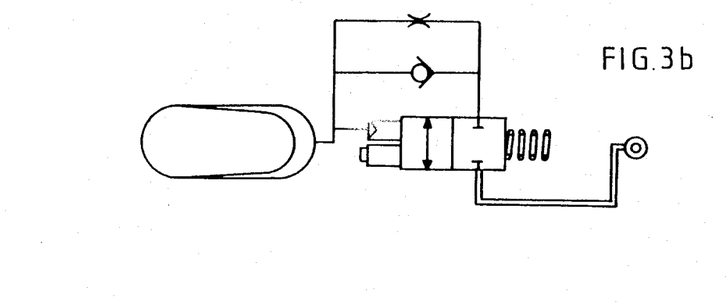
Figure 4B:
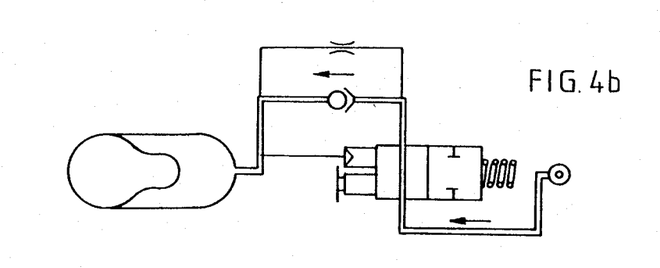
Figure 5B:
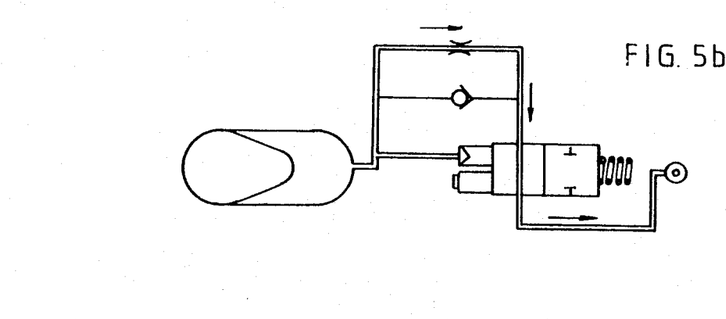

FIGS. 3 to 5 illustrate the operation of the above described distribution system.

In the example shown in FIG. 3a, the distribution system 18 is in the position which it would occupy in the actuator shown in FIG. 1, in which cylinder 2 is in the retracted condition, the pressure of the drive fluid being non existent and the cock being in the rest safety position. Push rod 27 of the distribution system 18 which extends beyond the end 20 of rod 5 of cylinder 2 is not urged. In this case, the pressure spring 28 holds slide valve 24 at the front end of travel (collar 25 in abutment) and orifice 37 of the discharge chamber 33 is closed off, so that the pressure of the hydraulic fluid remaining in the accumulation chamber 46 cannot escape towards the work chamber 17 of the cylinder which happens to be at zero pressure. The hydraulic diagram corresponding to the configuration of the distribution system is shown in FIG. 3b.

If, from the position of the actuator shown in FIG. 1, pressurized drive fluid is fed inside the work chamber 17 of cylinder 2, cylinder 2 will be extended without any appreciable modification of the position of the distribution system 18 (except in the case of an over pressure in the accumulation chamber). At the end of travel of the hydraulic cylinder, push rod 27 of the distribution system 18 comes into abutment against the bottom of the protection bell 13' (position shown in FIG. 2), which causes an axial movement of slide valve 24 against the action of spring 28 (position shown in FIG. 4a). The lateral orifice 21 of the body 19 of the distribution system 18 is then situated at right angles to the orifice 37 of the discharge chamber 33. Because of the pressure difference between the accumulation chamber 46 and the work chamber 17 of cylinder 2, the fluid pushes the ball 39 of the calibrated valve back against the action of spring 40 and penetrates into the accumulation chamber 46 while compressing the nitrogen contained by the resilient membrane 14 (hydraulic diagram of the distribution system shown in FIG. 4b).

When the pressure difference between the work chamber 17 of cylinder 2 and the accumulation chamber 46 drops below a pre-determined threshold, ball 39 is again pushed back onto its seat 38. However, this pressure difference is progressively cancelled out because of the calibrated passage of part 41 of rod 30. The actuator is then in the set position. Because of the fluid held under pressure in the accumulation chamber 46 by the nitrogen compressed in the resilient membrane 14, it has a potential energy reserve able to return the actuator/cock assembly back to the initial position.

This return to the initial position of the actuator is obtained by releasing the pressure of the drive fluid in the work chamber 17 of cylinder 2. In this case, return to the initial position of the assembly is achieved under the effect of the thrust of the pressurized fluid contained in the accumulation chamber 46 on the end 20 of rod 5 of cylinder 2.

Should an over pressure occur at any moment in the accumulation chamber 46, the pressurized fluid exerts on push rod 27 of the distribution system 18 a force which causes slide valve 24 to move against the action of spring 28. Under the effect of this movement, orifice 37 of discharge chamber 33 comes into a position at right angles to the lateral orifice 21 of body 19. The discharge chamber is then in communication with the accumulation chamber 46, whereas the calibrated valve (ball 39-seat 38) remains closed. A braked fluid stream may however flow through the sintered material element 41 into the intermediate chamber 32 then through orifices 42, 43 and channel 44 into the intake chamber 31, upstream of the calibrated valve. This flow continues until the pressure inside the accumulation chamber 46 returns to an acceptable pre-determined level at which the force exerted by spring 28 becomes higher than the force applied on push rod 27 by the fluid contained in the accumulation chamber 46. In this case, under the effect of spring 28, slide valve 24 comes back to its initial position with collar 25 in abutment and orifice 37 of the discharge chamber 33 is again closed off (FIG. 3a). This operation may take place over the whole travel of the rod of the cylinder.

In the above described example, the actuator operates by means of a single acting hydraulic cylinder. However, it would be possible for safety reasons to use a double acting hydraulic cylinder. In this case, return of the actuator to its original position could be provided by the cylinder and/or the energy accumulation device.

What is claimed is:

1. An actuator for driving a valve shaft comprising:
   a frame;
   a cylinder connected to the frame;
   piston means supported in the cylinder for reciprocating movement therein and forming, with the cylinder, a working chamber for receiving a pressurized fluid;

accumulator means connected to the frame and forming an accumulation chamber;

cylinder rod means attached to the piston and extending therefrom, the cylinder rod means including a back end portion supported for sliding movement into and out from the accumulation chamber, the cylinder rod means forming a through bore for conducting pressurized fluid between the working chamber and the accumulation chamber; and a distributor supported by the cylinder rod means and extending into the through bore to control the flow of pressurized fluid therethrough, the distributor having an open position for conducting pressurized fluid between the working and accumulation chambers, and a closed position closing the through bore, the distributor including (i) a first flow path for conducting fluid through the through bore, from the working chamber to the accumulation chamber, (ii) a check valve located in the first flow path and having a first position closing the first flow path and a second position opening the first flow path, the check valve moving from the first position to the second position when the distributor is in its open position and fluid pressure in the accumulation chamber is below the fluid pressure in the working chamber by at least a preset amount, (iii) a second flow path for conducting fluid through the through bore between the working chamber and the accumulation chamber when the distributor is open, (iv) a throttling valve located in the second flow path to conduct a restricted fluid flow therethrough and gradually adjust the pressure in the accumulator chamber when the distributor is open and the check valve is closed, and (v) means for moving the distributor between its open and closed positions.

2. An actuator according to claim 1 wherein the means for moving the distributor includes operating means for moving the distributor to its open position when the cylinder rod means reaches a predetermined extended position, and for moving the distributor to its open position when the fluid pressure in the accumulator chamber rises above a predetermined level.

3. An actuator according to claim 2 wherein:

the distributor further includes a body having a first opening, and a slide valve having a second opening, said first and second openings being in fluid communication when the distributor is in its open position; and the operating means includes (i) a spring engaging the slide valve to urge said first and second openings away from each other, and (ii) a push rod to push the slide valve against the spring and to bring said first and second openings into fluid communication when the cylinder rod means reaches the predetermined extended position, and to bring said frist and second openings into fluid communication when the fluid pressure in the accumulation chamber rises above the predetermined level.

4. An actuator for driving a valve shaft comprising:
a frame;
a cylinder connected to the frame;
a piston supported in the cylinder for reciprocating movement therein and forming, with the cylinder, at least a working chamber for receiving a pressurized fluid;

accumulator means connected to the frame and forming an accumulation chamber including a first abutment surface;

a cylinder rod attached to the piston and extending therefrom, the cylinder rod including a back end portion supported for sliding movement into and out from the accumulation chamber;

a through bore formed in said cylinder rod and in said piston for conducting pressurized fluid between the working chamber and the accumulation chamber; and a distributor supported by the cylinder rod and extending into the through bore to control the flow of pressurized fluid therethrough, the distributor including (i) body means having an open position for conducting pressurized fluid between the working and accumulation chambers, and closed position closing the through bore, (ii) actuation means having a second abutment surface to engage the first abutment surface to move said body means from said closed position to said open position when the cylinder rod reaches a predetermined extended position, said actuation means being in fluid communication with the accumulation chamber to also move said body means from said closed position to said open position when fluid pressure in the accumulation chamber reaches a predetermined level, (iii) first and second flow paths extending through said body means for conducting fluid through the distributor, (iv) a check valve located in the first flow path and having a first position closing the first flow path and a second position opening the first flow path, the check valve moving from the first position to the second position when the body means in its open position and fluid pressure in the accumulation chamber is below the fluid pressure in the working chamber by at least a preset amount, and (v) a throttling valve located in the second flow path to conduct a restricted fluid flow therethrough when the body means is open and the check valve is closed.

5. An actuator according to claim 4 wherein:
said body means includes
(i) an outer cylinder held within a portion of the through bore, and
(ii) a cylindrical slide valve member mounted for limited sliding movement in the outer cylinder; and said actuation means includes
(i) a push rod attached to a first end of the slide valve member and having the second abutment surface, and
(ii) a spring held within said through bore, engaging a second end of the slide valve member and urging the slide valve member toward the accumulation chamber;

said slide valve member including
(i) a first chamber, and
(ii) a lateral opening extending outward from the first chamber, said lateral opening being closed by the outer cylinder when the body means is in the closed position, and being in fluid communication with the accumulation chamber when the body means is in the open position.

6. An actuator according to claim 5 wherein:

the slide valve member further includes
   (i) a second chamber, and
   (ii) an end opening for conducting fluid between said second chamber and the through bore;

the check valve is mounted in the second chamber; and the first flow path includes
   (i) a first axial groove in the slide valve member,
   (ii) a first aperture in the slide valve member, extending between the first chamber and the axial groove, and
   (iii) a second aperture in the slide valve member, extending between the second chamber and the axial groove.

7. An actuator according to claim 6 wherein:

the slide valve member further includes a third chamber located between the first and second chambers;

the throttling valve is located in the third chamber; the second flow path includes
   (i) a second axial groove in the slide valve member,
   (ii) a third aperture in the slide valve member, extending between the third chamber and the second axial groove, and
   (iii) a fourth aperture in the slide valve member, extending between the first chamber and the second axial groove.

8. An actuator according to claim 6 wherein the throttling valve includes a sintered element to pass a calibrated leak of fluid through the distributor.

9. An actuator according to claim 8 wherein the accumulator means includes a resilient membrane secured within the accumulation chamber and forming a gas compartment therein; and a supply of gas held within said gas compartment.

10. An actuator according to claim 9 wherein the accumulator means further includes a protection bell held within the accumulation chamber to protect the resilient membrane from the cylinder rod.

* * * * *